Patented Sept. 7, 1948

2,448,684

UNITED STATES PATENT OFFICE 2,448,684

PROCESSES OF DE-EMULSIFICATION OF WATER GAS TAR EMULSIONS AND OIL GAS TAR EMULSIONS

Sebastian A. Petrino, Brooklyn, N. Y.

No Drawing. Application August 10, 1946, Serial No. 689,816

6 Claims. (Cl. 252—332)

This invention relates to the process of de-emulsifying carburetted water gas tar emulsions, which are produced by cracking oil vapors at high temperatures in the manufacture of carburetted water gas, and oil gas tar emulsions, which are produced by cracking oil vapors at high temperatures in the manufacture of oil gas.

In both of the aforementioned processes of gas manufacture, the cracking of the oil is accomplished in the presence of water vapor. The formation of the tar emulsion occurs during the subsequent cooling and condensing of the manufactured gas which must of necessity precede the final stages of purification of manufactured gas prior to its distribution as a fuel.

The volume of tar (dry basis) formed may vary from 5% to 30% of the volume of carburetting oil used, depending on operating conditions and on the grade of carburetting oil used in the manufacture.

The presence, in the tar, of stabilizing or emulsifying agents, which are simultaneously formed during the oil cracking period, is responsible for the stability of tar emulsions, and the ability of the tar to retain as high as 85.0% of water.

Tar emulsions are of the water in oil type; that is, an emulsion in which water is the dispersed or inner phase, and tar the continuous or outer phase.

Unless the breaking or de-emulsification of the tar is accomplished at a rate greater than emulsification, serious plant difficulties are experienced, since the emulsion handling facilities are limited as are those employed for de-emulsification of the tar emulsions.

The object of this invention is to render the process of de-emulsification of tar emulsions more expeditious, regardless of plant facilities, and to eliminate tar emulsion difficulties with considerable reduction in costs.

The de-emulsification of tar emulsions is generally accomplished by subjecting the emulsion to heat treatment, in a suitable tank within which is contained a steam heating element, followed by settling. This step is preliminary, and results in some reduction of the water content of the emulsion. As established by common usage in the gas industry, a tar containing up to and including 5.0% of water is not considered an emulsion. Therefore, if the tar, after preliminary treatment contains more than 5.0% of water, further treatment is necessary and one or more of the following methods, depending on plant facilities may be used.

(1) Further heating with chemical treatment consisting of a water solution of an alkali metal carbonate or hydroxide, and settling.

(2) The R S De-emulsifier which combines heat, pressure and chemical treatment. In the chemical treatment there is used a water solution of an alkali metal carbonate or hydroxide. A detailed description of the R S De-emulsifier appears on pages 1363–4 of the 1928 Proceedings of the American Gas Association in an article by E. B. Gebhardt, Jr., entitled "The R S De-emulsifier."

(3) By means of centrifugal separators such as manufactured by Sharples and De Laval. This method of de-emulsification, because of the maintenance and operating difficulties experienced has not, up to the present time, proved satisfactory for large volume operation. Therefore it shall not be given further consideration in this specification.

Under any of the aforementioned processes with alkali metal hydroxide or carbonate treatment, de-emulsification proceeds at a very slow rate. A considerable amount of process steam is required and the separated water contains large amounts of dispersed tar which at times runs as high as 15%. This dispersion or emulsion of the oil in water type which results, presents a very serious problem, since this water must be discharged as plant effluent to rivers, harbors or ocean, as the case may be, and may lead to serious difficulties with the authorities.

Instead of depending solely upon the agencies of a solution of an alkali metal carbonate or hydroxide, and/or heat, I employ to enhance the de-emulsification of tar emulsions, a hydrocarbon derivative, which is soluble in water and compatible in alkaline solutions, together with an alkaline metal salt such as sodium and/or potassium carbonate, hydroxide, silicates and phosphates. The hydrocarbon derivative and alkali metal salt are employed in water solution, which is added, in varying proportion to the tar emulsion to be treated, prior to heating in open (atmospheric) or closed (pressure) vessels.

J. J. Morgan and C. F. Stolzenbach writing in the American Gas Association Monthly 16, 245–8, 277–80 (1934), under the title "Heavy oil tar emulsions in the water gas process," state that the stability of tar emulsions increased with increase of asphaltene content and with increase of "free carbon" content. The "free carbon" acts as a secondary stabilizer.

I have reason to believe, to be more specific, that the stabilizing agent responsible for the stability of tar emulsions is that portion of the tar which comprises the saponifiable matter and which may be present in the tar in concentrations of between 1.0% to 2.0%, by weight of the dry tar. It appears that the saponifiable matter consists of esters of the hydrocarbon carboxylic acids and/or of the esters of the hydrocarbon hydroxy acids and/or of the acids themselves, which are formed when the carburetting oils are cracked at high temperature in the presence of water vapor. Because of the nature of the conditions under which the aforementioned products are formed, it is reasonable to infer that they are of complicated chemical composition and of very complex mixture, and hence it is not possible to give in detail the reactions involved in their formation.

I have for example extracted tars of this character with ethyl alcohol and upon drying the extract obtained a resinous material which seemed to be a substance of high molecular weight soluble only in alcohol. The tar, after the extraction of this material, could not be emulsified with water even upon violent agitation. Therefore, in dealing with the de-emulsification of these tar emulsions one must of necessity perform some operation which nullifies the effect of these naturally occurring emulsifying agents. The process of de-emulsification is, consequently, not simply a physical action but involves actually the chemical conversion of these naturally occurring emulsifying agents by hydrolysis or analogous mechanism. The problem, therefore, is quite different from that encountered in the conventional de-emulsification of common oil-water emulsions, such as crude oil emulsions, where the action of the de-emulsifying agent is primarily of a physical nature.

Because of the general chemical composition of the substances I have reason to believe constitute the primary stabilizing agent, I propose to de-emulsify tar emulsions by means of catalytic hydrolysis. I employ a water solution of an alkaline metal salt together with a hydrocarbon derivative as a catalyst to promote the hydrolysis of the stabilizer under the influence of varying degrees of heat.

The hydrocarbon derivative employed according to the present invention includes many compounds which are commonly known as de-emulsifying agents for crude oil emulsions but does not include many of the commonly known agents for this purpose. For example, sulphonated castor oil, or Turkey-red oil, is not suitable for the purpose of the present invention. Likewise oil soluble petroleum sulphonates do not function in the process of the present invention. Another common de-emulsifying agent which is unsuitable is Twitchell's base or sulphonated oleic acid.

In general it may be stated that the hydrocarbon derivatives which are suitable for use in the present invention must be, in the first instance, water soluble. They are derivatives of high molecular weight which contain one or more hydrophilic groups. Generally these substances are sulphonates, and in addition to the sulphonate group may contain hydroxy groups, amino groups and/or carboxy groups. Water soluble sulphonates of aromatic hydrocarbons, particularly the poly nuclear compounds, are effective. Sulphonates of high molecular weight alcohols and amino compounds, where they are water soluble, can be employed. Water soluble sulphonates of resins obtainable by condensing phthalic anhydride and its derivatives with polyhydric alcohols and Diel's-Adler condensation products are also suitable, particularly where there is included in the molecule a long aliphatic chain containing one or more hydroxy groups. Specific compounds which have been found effective are:

Benzene sulfonic acid, sodium salt of benzene sulfonic acid, nitrobenzene sulfonic acid, sodium salt of nitrobenzene sulfonic acid, naphthalene sulfonic acid, sodium salt of naphthalene sulfonic acid, xylene sulfonic acid, sodium salt of xylene sulfonic acid, and certain compounds sold under a trade name such as: Sulfatate described as a hydrocarbon sulfonate, and Nacconal NR described as the sodium salt of an alkylaryl sulfonic acid.

The hydrocarbon derivatives heretofore discussed do not of themselves effect any substantial improvement in the de-emulsification of these tar emulsions. In fact the hydrocarbon derivative itself does not improve the de-emulsification as much as does the alkali metal salt alone. The combination of the two, however, effects rapid and quite complete de-emulsification.

The alkali metal salt employed in the present invention must be one having an alkaline reaction. While caustic soda or potash could be employed, safety precautions dictate a preference for equivalent quantities of milder compounds such as carbonates, phosphates, etc. Sufficient alkali metal salt should be employed to maintain a pH in the water phase between about 9 and 11, preferably between 9.6 and 10.6. When the sulphonate is employed in the form of its alkali metal salt, less of the alkali metal salt will be required to maintain the pH in the operating range. The maintenance of the prescribed pH is quite critical to the success of the operation according to the present invention. The amount of hydrocarbon derivative will in general vary between one part to 20,000 parts of emulsion by volume and one part to about 90,000 parts of emulsion by volume depending upon the particular emulsion. The exact amount to be employed can be determined by a simple preliminary test.

My experiments have led me to believe that the de-emulsification of tar emulsions is largely dependent upon absorption phenomenon at the tar water interface to effect hydrolysis of the primary stabilizing agent to destroy its emulsifying power by chemical reaction, and that the failure of heat pressure and chemical treatment as heretofore practised, has been largely due to the failure of establishing a proper physical and/or chemical relationship between the tar emulsion and the applied method of treatment.

I have found that the most effective catalytic hydrolyzing agents are those water soluble hydrocarbon derivatives whose hydrophilic, or water attracting ends, exhibit a strong affinity for, or a high solubility tendency toward the water (dispersed phase), and whose hydrophobic, or water repelling ends, exhibit a strong affinity or a high solubility toward the tar (continuous phase).

Such an agent orients and becomes absorbed at the tar water interface, thus lowering the tension and free energy at the interface. Under these conditions, in the presence of heat, hydrolysis (saponification) of the primary stabilizing agent is effected. The product of hydrolysis is absorbed or dissolved on the water side resulting in further lowering of the tension and free energy at the interface. When this condition is met, phase inversion is induced and separation of water is accelerated.

Although amongst prior art processes, the equipment and procedure used for the de-emulsification of tar does not differ from that required for the present invention, excepting as the latter pertains to the employment of the catalyst as herein described, the rate of de-emulsification is considerably less.

I shall now describe my invention as applied to two practical adaptations thereof, but it will be understood that it is not to be construed as limited thereto:

*Example I.—Atmospheric heating and catalytic treatment*

The catalyst is prepared by dissolving 100 pounds of soda ash in 60 gallons of hot water. To this is added two pounds of Sulfatate, the sodium salt of a sulfonate of an alkylated aryl compound marketed by Glyco Products, of Brooklyn, N. Y. The above solution is added, either by proportioning or intermittently, to 30,000 gallons of the tar emulsion to be treated, during the time the tar emulsion is being transferred to an open heating vessel. (The vessel ordinarily employed is a vertical cylindrical steel tank within which is contained a steam heating element. Provisions are made, by means of a manifold, to pump into or draw out of the tank at any desired level. Also by means of a manifold a sample of the contents of the vessel may be drawn from any desired level. Also provided are temperature recording and temperature indicating gages.) After 30,000 gallons of the tar emulsion has been transferred to the heating vessel, a representative sample of the emulsion is drawn and the water content determined. Steam at 125 p. s. i. is then admitted to the heating element and the temperature of the contents of the vessel is permitted to rise to 212° F. and then held at that point for six hours. At the end of this time the steam is shut off and the contents of the vessel permitted to settle. Now since the specific gravity of tar is greater than that of water, the tar settles to the bottom of the vessel and the water rises to the top. After an eight hour period of settling, samples of the tar are drawn off at the lower levels of the vessel and the water content of the tar is determined. If less than 5.0% of water is present the tar is drawn off from the bottom of the vessel and transferred to "separated" tanks for shipment. The separated water is returned to the plant circulating system from whence it enters the sewers as effluent.

*Example II.—Atmospheric heating and catalytic treatment*

The catalyst is prepared by dissolving 100 pounds of soda ash in 60 gallons of hot water. To this is added 0.5 pound of the sodium salt of 1-naphthalene sulfonic acid. The procedure, after preparation of the catalyst, as described under Example I above is then followed.

*Example III.—Atmospheric heating and catalytic treatment*

The catalyst is prepared by dissolving 100 pounds of soda ash in 60 gallons of hot water. To this is added one pound of Nacconal NR, a sodium keryl benzene sulfonate marketed by National Aniline Division of Allied Chemical. The procedure, after preparation of the catalyst, as described under Example I above is then followed.

For a clearer understanding of the invention the following tabulation is given in Table I. The first column of data was derived from an actual run during which no chemical treatment was used. The second column of data was derived from an actual run during which 100 pounds of soda ash dissolved in 60 gallons of hot water was used as the chemical treatment. Columns appearing under run #3, 4, and 5 represent the data derived from actual runs employing the catalytic treatment as described in the hereinbefore Examples I, II, and III respectively. Column 6 represents the data obtained when using the hydrocarbon derivative alone. The data in columns under run #1 and 2 are given for purposes of comparison.

TABLE I

*Comparative tabulation of results of tar de-emulsification with and without catalyst*

| Actual plant run number | 1 | 2 | 3 | 4 | 5 | 6 |
|---|---|---|---|---|---|---|
| Volume of tar emulsion treated | 30,000 Gal | 30,000 Gal | 30,000 Gal | 30,000 Gal | 30,000 Gal | 30,000 Gal. |
| Chemical treatment | None | 100 lbs. Soda Ash in 60 gal. Water. | Ex. I | Ex. II | Ex. III | Hydrocarbon derivative only. |
| Water content of emulsion | 50.0% | 45.0% | 58.0% | 49.0% | 43.0% | 47.0%. |
| Water content of treated tar | 40.0% | 24.0% | 5.0% | 4.8% | 4.1% | 27.0%. |
| Percent of original water removed | 20.0% | 46.6% | 91.4% | 90.2% | 90.5% | 42.6%. |
| Time emulsion held at 212° F | 12 hrs | 12 hrs | 6 hrs | 6 hrs | 6 hrs | 12 hrs. |
| Time settling after heating | 24 hrs | 24 hrs | 8 hrs | 8 hrs | 8 hrs | 24 hrs. |
| Total time for treatment | 36 hrs | 36 hrs | 14 hrs | 14 hrs | 14 hrs | 36 hrs. |

*Example IV.—Pressure, heat and catalytic treatment*

The catalyst is prepared by dissolving 50 pounds of soda ash in 60 gallons of hot water. To this is added one pound of Sulfatate, a hydrocarbon sulfonate. The above solution is added, either by proportioning or intermittently, to 9600 gallons of the tar emulsion to be treated, during the time the tar emulsion is being transferred to the pressure vessel. (R. S. De-emulsifier.) When 9600 gallons of the tar emulsion and catalyst have been placed therein, a representative sample of the contents is drawn for the determination of the water content of the emulsion, the vents are closed and steam at 125 p. s. i. is then admitted to the heating element contained within the pressure vessel. The pressure is permitted to rise to 90 p. s. i. gage. When this pressure is reached, as indicated on a gage provided, the steam is shut off and the pressure is permitted to drop by atmospheric cooling. Samples are drawn at intervals as the pressure drops and the water content is determined.

*Example V.—Pressure, heat and catalytic treatment*

The catalyst is prepared by dissolving 50 pounds of soda ash in 60 gallons of hot water. To this is added ½ lb. of Nacconal NR, a sodium salt of a keryl benzene sulfonate. The procedure, after preparation of the catalyst, as described under Example IV above is then followed.

*Example VI.—Pressure, heat and catalytic treatment*

The catalyst is prepared by dissolving 50 pounds of soda ash in 60 gallons of hot water. To this is added ½ lb. of the sodium salt of 1-naphthalene sulfonic acid. The procedure, after preparation of the catalyst, as described under Example IV above is then followed.

*Example VII.—Pressure, heat and catalytic treatment*

The catalyst is prepared by dissolving 50 pounds of soda ash in 60 gallons of hot water. To this is added ½ lb. of the sodium salt of xylene sulfonic acid. The procedure, after preparation of the catalyst, as described under Example IV above is then followed.

The following data in Table II is representative of the results obtained employing the catalysts as described in the hereinbefore Examples IV, V, VI, and VII. Columns 1 and 2 represent data obtained using soda ash only, and is given for the purpose of comparison. Columns 3, 4, 5 and 6 represent the data derived from actual plant runs employing the catalytic treatment as described in the hereinbefore Examples IV, V, VI and VII respectively. Column 7 represents the data obtained when the hydrocarbon derivative alone was employed.

The following data is representative and comparative:

classes hereinbefore identified is markedly superior in an unexpected degree to the individual action of these chemicals.

Having described the nature and objects in my invention and illustrated it by working examples, what I claim is:

1. A method for de-emulsifying a water-in-tar emulsion resulting from a gas-making operation which comprises adjusting the pH of the water phase of the emulsion to a value between about 9 and 11 and heating the resulting mixture in the presence of a water soluble solphonate of an aromatic hydrocarbon.

2. A method according to claim 1 in which the aromatic hydrocarbon is polynuclear.

3. A method according to claim 1 in which the heating step is conducted under pressure.

4. A method for de-emulsifying a water-in-tar emulsion resulting from a gas-making operation which comprises heating the emulsion in the presence of sufficient alkaline alkali metal compound to maintain the pH of the water phase between about 9 and 11 and a small amount of a water soluble sulphonated aromatic hydrocarbon.

5. A method according to claim 1 in which the hydrocarbon is an alkylated aromatic hydrocarbon.

6. A method according to claim 1 in which the

TABLE II

| Actual plant run number | 1 | 2 | 3 | 4 | 5 | 6 | 7 |
|---|---|---|---|---|---|---|---|
| | Run #1 | Run #2 | Run #49 | Run #450 | Run #88 | Run #84 | |
| Volume of tar emulsion to de-emulsifier. | 9,600 gals. | 9,600 gals. | 9,600 gals. | 9,600 gals. | 9,600 gals. | 9,600 gals. | 9,600 gals. |
| Water content of emulsion. | 11.5%. | 20.0%. | 11.0%. | 21.0%. | 85.0%. | 10.5%. | 35.0%. |
| Chemical treatment. | 100 lbs. Soda Ash. | 100 lbs. Soda Ash. | 1 lb. Cat. +50 lbs. Soda Ash. | 2 lb. Cat. +50 lbs. Soda Ash. | 1 lb. Cat. +100 lbs. Soda Ash. | 45 gms. Cat. +100 lbs. Soda Ash. | Hydrocarbon derivative only. |
| Maximum pressure (gage). | 90 p. s. i. | 90 p. s. i. | 90 p. s. i. | 90 p. s. i. | 90 p. s. i. | 90 p. s. i. | 90 p. s. i. |
| Time for complete treatment. | 24 hrs. | 24 hrs. | 5 hrs. | 4½ hrs. | 7 hrs. | 4 hrs. | 24 hrs. |
| Water content of treated tar. | 7.0%. | 7.5%. | 1.6%. | 3.1%. | 4.5%. | 1.76%. | 8.2%. |
| Per cent of original water removed. | 38.7%. | 62.05%. | 85.4%. | 85.2%. | 94.7%. | 83.2%. | 76.6%. |
| Appearance of separated water. | Black dispersion undetermined percent of tar. | Black dispersion containing 10.6% tar. | Dark brown clear. | Brown clear. | Brown clear. | Very dark brown Sl. dispersion. | Straw colored slightly turbid. |

It will be observed from the foregoing data that, by using the combination of the alkali metal salt and the hydrocarbon derivative, referred to as a catalyst, jointly, not only was the de-emulsification more complete, resulting in each case in clear water, but the time required to achieve this result was greatly diminished. In the foregoing specification I have attempted to explain the mechanism by which this combination of chemicals functions. It is to be understood that this explanation constitutes my theory of this action and that I am not in any way bound by this or any other theory. My intention is to describe only my invention which resides in the discovery that the combined action of chemicals of the two sulphonated hydrocarbon is sulphonated kcryl benzene.

SEBASTIAN A. PETRINO.

REFERENCES CITED

The following references are of record in the file of this patent:

UNITED STATES PATENTS

| Number | Name | Date |
|---|---|---|
| 1,724,222 | Ripley et al. | Aug. 13, 1929 |
| 1,944,021 | Walker | Jan. 16, 1934 |
| 2,027,965 | Dellmann | June 14, 1936 |
| 2,168,309 | Alexander | Aug. 8, 1939 |
| 2,224,228 | Lunn et al. | Dec. 10, 1940 |